United States Patent [19]

Miller et al.

[11] 4,452,132

[45] Jun. 5, 1984

[54] FOOD STEAMER

[75] Inventors: Dye O. Miller, Mount Prospect; August J. Antunes, Elmhurst; Jerome Antunes, Clarendon Hills, all of Ill.

[73] Assignee: A. J. Antunes & Co., Chicago, Ill.

[21] Appl. No.: 447,469

[22] Filed: Dec. 6, 1982

[51] Int. Cl.³ .......................... A23L 3/00; A23L 3/16; A47J 27/04; A47J 36/24
[52] U.S. Cl. ....................................... 99/483; 99/516; 99/532; 126/369; 219/401
[58] Field of Search ................ 99/483, 516, 532, 419, 99/467, 450, 472, 473, 474; 126/369, 369.1-369.3; 219/401; 34/237, 238; 220/298, 300-302; 137/15

[56] References Cited

U.S. PATENT DOCUMENTS 3,889,582 6/1975 Binks et al. ................... 99/516 X
4,291,617 9/1981 Miller et al. .................. 99/516 X Primary Examiner—Timothy F. Simone Attorney, Agent, or Firm—McDermott, Will & Emery

[57] ABSTRACT

A food steamer includes a housing that contains a steam generating chamber covered by a removable top plate that mounts a plurality of steam injection needles. Steam is conveyed from the chamber upwardly through the needles, exiting through the upper open end of the needles. The needle mounting plate is removably secured to the housing by way of a U-shaped pin which threads through mating projecting portions on opposite sides of the plate and on opposite sides of the chamber. The plate may be removed by pulling outwardly on the U-shaped pin and lifting the plate off of the housing. A removable cover is mountable on the housing over the injection needles. A drawer is slidable into and out of the cover and includes a portion for containing the food item to be warmed. The interior of the drawer communicates with the upper open end of the needles so that the food within the interior of the drawer may be steamed.

12 Claims, 7 Drawing Figures

FOOD STEAMER

BACKGROUND OF THE INVENTION

1. Field of the Invention

This invention relates generally to apparatus for steaming food.

2. Brief Description of the Background Art

It is well known in the art to steam heat foods by injecting steam internally into food items, such as buns or rolls. Generally injection steamers include upwardly extending steam injection needles which communicate with a steam chamber and directly convey the steam into the interior of the food item to be warmed. One efficient device of this general category is described in U.S. Pat. No. 4,291,617 assigned to the assignee in the present invention.

While currently known injection steamers are capable of a wide variety of applications, there is a continuing demand for injection steamers which are more easily disassemblable to facilitate cleaning. This is true particularly because of the propensity of these devices to clog and fill up with water precipitates.

In addition, it would be desirable to provide a way to convert an injection steamer into a flash steamer capable of steaming bulk or flowable food items which cannot be inserted onto the injection needles. Currently a commerical food preparer must have one steamer for steaming food items which are integral solids such as buns and rolls and another steamer for steaming bulk items such as spaghetti and the like. It would be highly desirable to provide a single apparatus which is convertible to fulfill both functions.

SUMMARY OF THE INVENTION

It is one object of the present invention to provide a steaming apparatus which is convertible from an injection steaming mode to a bulk or flowable food item steaming mode.

It is another object of the present invention to provide a removable cover and drawer mechanism for an injection steamer to provide for steaming of bulk or flowable food items.

It is another object of the present invention to provide a mechanism for facilitating the removal of the injection needle mounting cover plate from an injection steamer.

It is still another object of the present invention to provide an improved apparatus for steam heating spaghetti.

In accordance with one preferred embodiment of the present invention a steamer for warming food items includes a housing and a chamber defined within the housing. The chamber includes means for generating steam. A plurality of steam injection needles are mounted on the housing in fluid communication with the chamber. A removable enclosure, positionable on the housing, may be arranged to enclose the steam injection needles. The enclosure includes means for containing a food item to be warmed.

In accordance with another preferred embodiment of the present invention, a steamer for warming food items includes a housing and a chamber defined within the housing, including means for generating steam. A plurality of injection needles each including a pair of spaced open ends are mounted on the housing. Each of the needles communicates by way of one open end with the chamber. An enclosure is mounted on the housing covering the needles and communicating with the other open end of each needle. A drawer is slidable into and out of the enclosure. The drawer is adapted to contain the food items within the interior of the drawer. The drawer interior is in fluid communication with the chamber by way of the needles when the drawer is located within the enclosure.

In accordance with still another preferred embodiment of the present invention a steamer for warming food items includes a housing and a chamber defined within the housing including means for generating steam. A plate is mounted on the housing for removably covering the chamber. A plurality of steam injection neeedles are mounted on and extend through the plate to communicate with the chamber. A means for sealingly securing the plate to the chamber includes an elongate pin which slidably extends through a portion of the chamber and a portion of the plate. The pin includes a portion extending outwardly of the housing to permit manual release of the plate from the chamber.

DESCRIPTION OF THE PREFERRED EMBODIMENT

Figure 1:
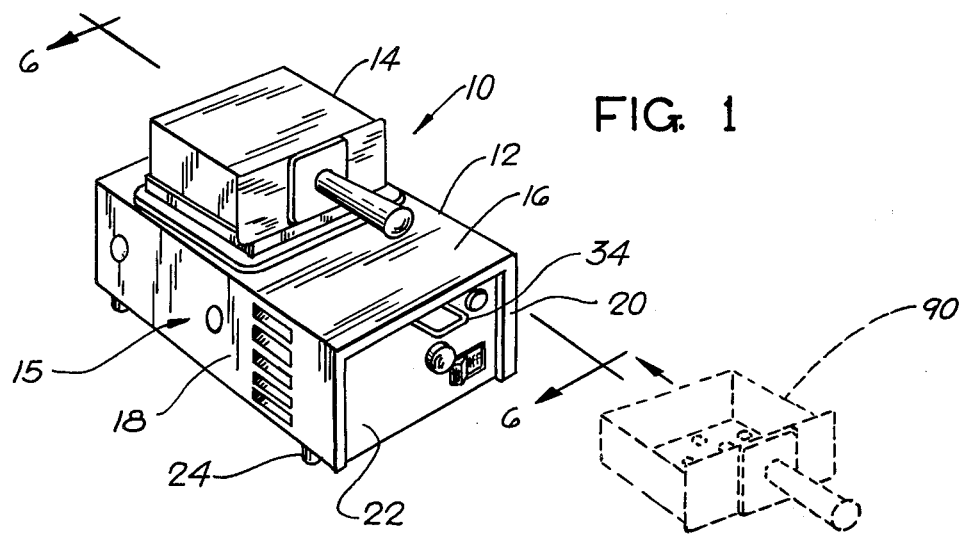
FIG. 1 is a perspective view of one embodiment of the present invention, showing the drawer in phantom removed from the device.

Referring to the drawing wherein like reference characters are used for like parts throughout the several views, a food steamer 10, shown in FIG. 1, includes a housing 12 and an enclosure 14 mounted atop the housing 12. The illustrated housing 12 includes a unitary U-shaped cover 15 with a top wall 16 and side walls 18. The front and rear edges of the side walls 18 and the top wall 16 define inwardly directed flanges 20 which enclose a base 22. The base 22 is supported by a plurality of feet 24 on a supporting surface. The housing 12 may be made of sheet metal or the like.

Figure 2:
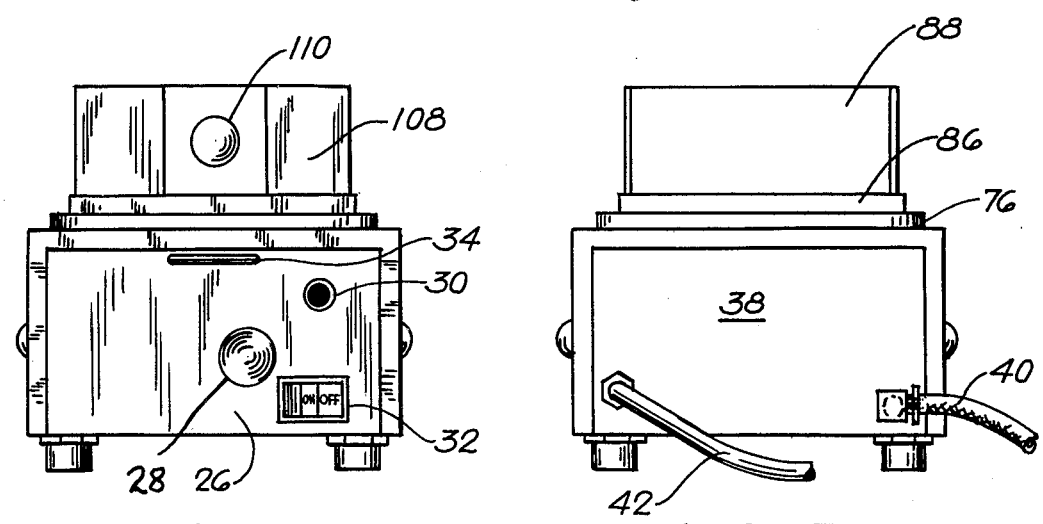
FIG. 2 is a front elevational view of the embodiment shown in FIG. 1.
Figure 3:
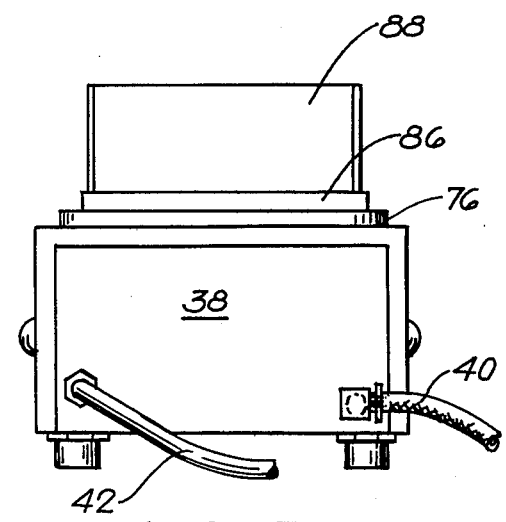
FIG. 3 is a rear elevational view of the embodiment shown in FIG. 1.
Figure 4:
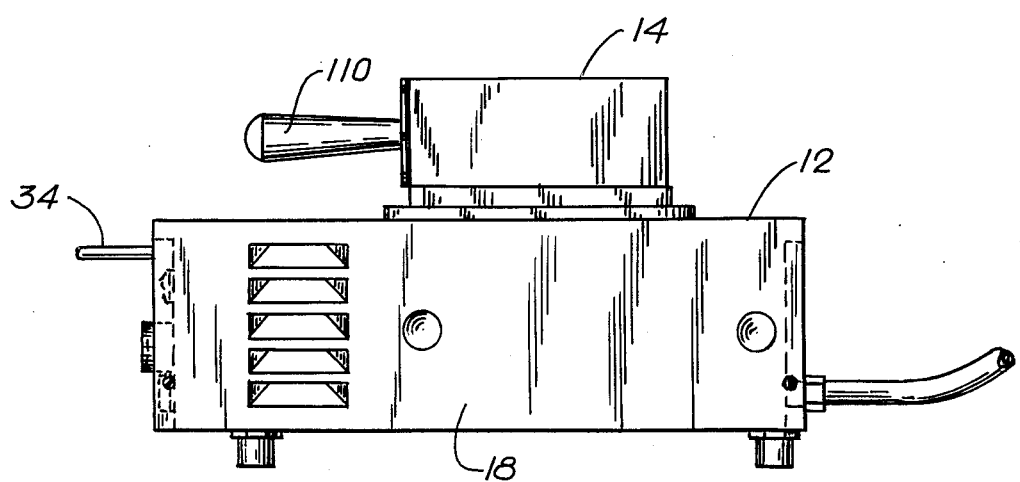
FIG. 4 is a side elevational view of the embodiment shown in FIG. 1.

The base front face 26 includes a plurality of controls including a pushbutton 28 operative to provide a burst or pulse of steam when desired, a steamer "ready" light 30, and an on/off switch 32, as shown in FIG. 2. In addition, the exposed portion 34 of a U-shaped pin retainer 36 extends generaly horizontally and forwardly from the base front face 26. As shown in FIG. 3, the base rear face 38 includes the connectors for connecting the steamer 10 to an electrical source and a water source (not shown). Particularly an electrical wire 40 feeds through the base rear face 38 and a water inlet tube 42 connects to a source of water.

Figure 5:
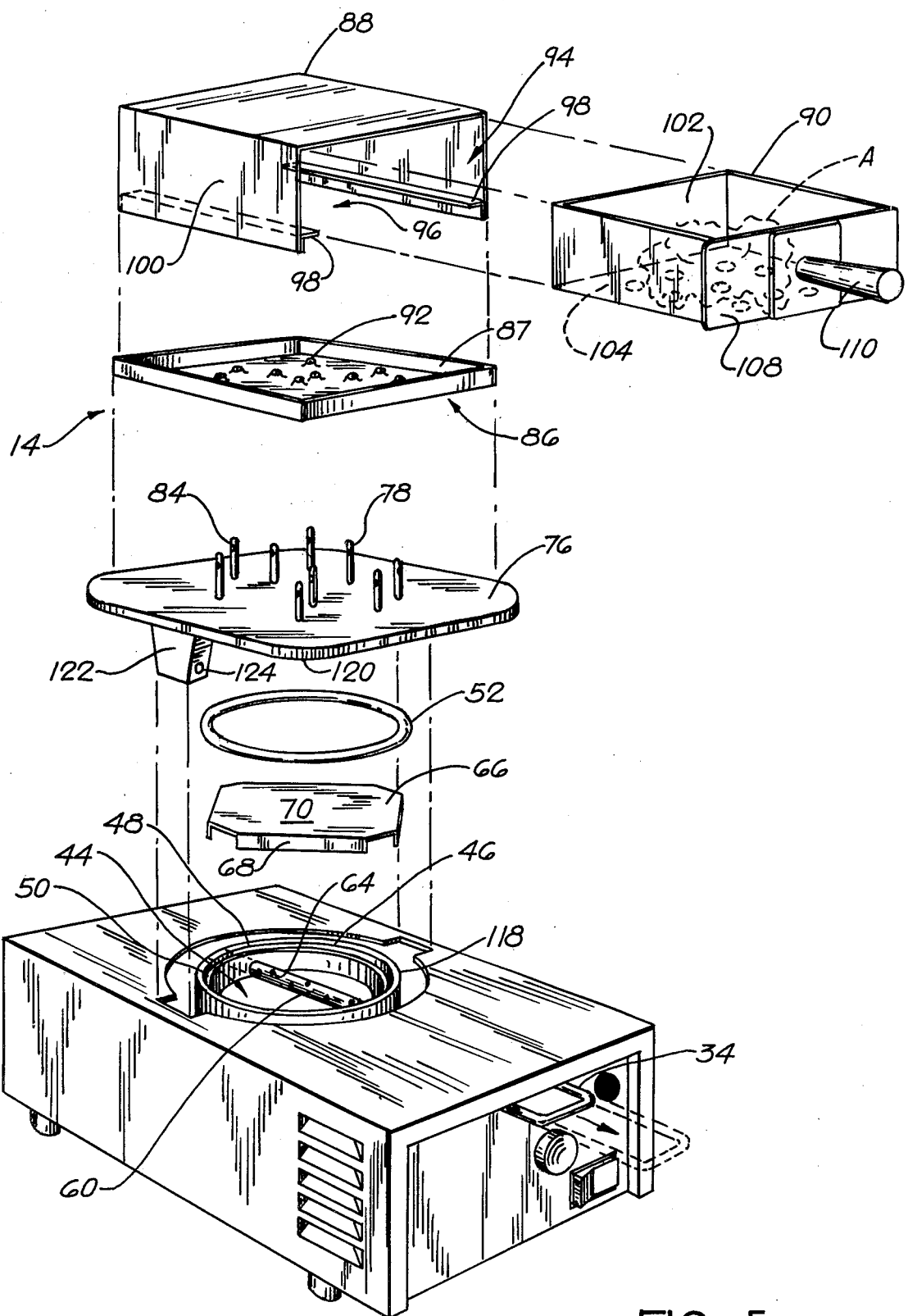
FIG. 5 is an enlarged, exploded, perspective view of the embodiment shown in FIG. 1.
Figure 6:
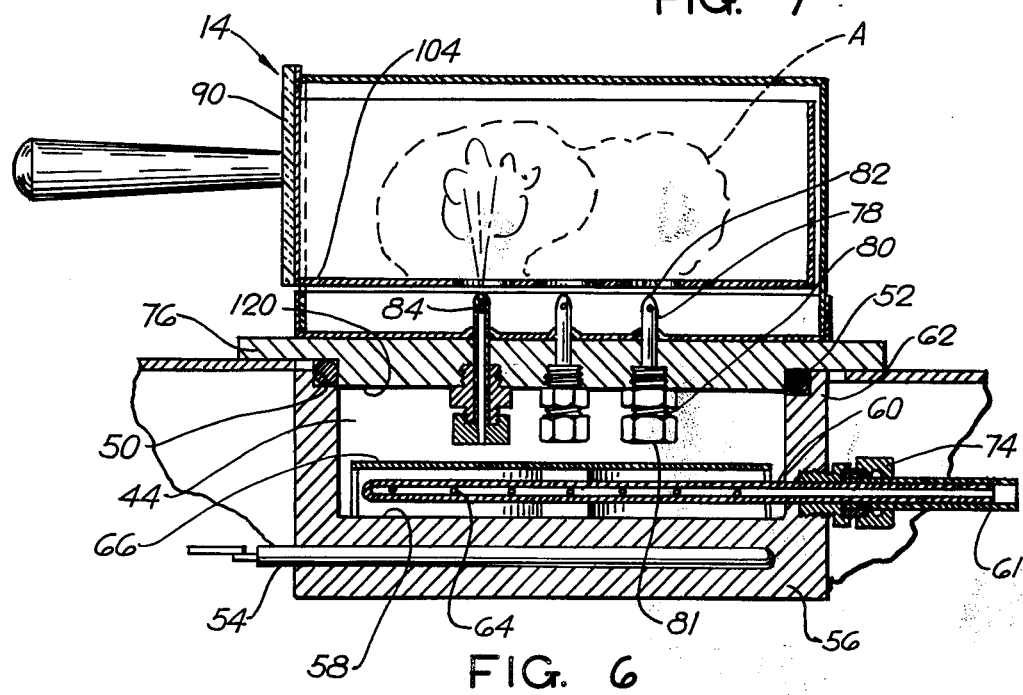
FIG. 6 is a partial, enlarged, cross-sectional view taken generally along the line 6—6 in FIG. 1.

As shown in FIGS. 5 and 6, a steam chamber 44 with an open top 46 is defined within the housing 12. The upper edge 48 of the steam chamber 44 includes a notch 50 designed to receive a seal or O-ring 52. Conveniently the steam chamber 44 has a cylindrical configuration, at least at its upper edge 48, that mates with a conventional O-ring 52. However a variety of other shapes for the sealing structure 52 and the steam chamber 44 may be adopted, if desired. A heating device 54 such as calrods or the like, may be imbedded within the lower wall 56 of the steam chamber 44 in order to provide a heated lower surface 58. A water spray tube 60, removably connected to the water inlet tube 42 through the water line 61, extends through the sidewall 62 of the chamber 44 and is arranged in a position spaced slightly from the surface 58. The length of the spray tube 60 is punctuated by a plurality of spray openings 64 in order to provide a distributed or diffused water spray from the water spray tube 60 onto the surface 58. Advantageously, the water spray tube 60 is made of a flexible material, such as Teflon, in order to facilitate the removal of contaminates and precipitates from the interior of the tube 60. This may be accomplished if desired conveniently by flexing or crinkling the tube 60 while flushing the tube with water. In addition it is advantageous to make the tube 60 separable from the water supply line 61, conveniently accomplished by a threaded coupling 74, as shown in FIG. 6.

A baffle 66 is removably positionable over the water spray tube 60 supported on the surface 58. The illustrated baffle 66 is in the form of a plate with downwardly extending feet 68 which space the horizontal surface 70 of the baffle 66 over the heated surface 58. The baffle 66 prevents water bubbles or spray from extending upwardly out of the chamber 44.

A steam chamber cover plate 76 is removably positionable over the open top 46 of the steam chamber 44. The plate 76 sealingly mounts on the steam chamber 44 due to the O-ring 52 that is received within the notch 50. Conveniently the cover plate 76 also generally rests on the top wall 16 of the housing 12.

A plurality of hollow, steam injection needles 78 are mounted in the cover plate 76. Each needle 78 is conveniently removably positionable in the plate 76 by means of a threaded coupling 80. Thus each needle 78 extends completely through the cover plate 76 to communicate on one end 81 with the interior of the steam chamber 44 and to extend upwardly away from the cover plate 76 on the other, pointed end 82. The end 82 includes a plurality of openings 84 which provide fluid communication between the chamber 44 and food items supported atop the housing 12.

The enclosure 14 may be removably positioned atop the cover plate 76. Conveniently the enclosure 14 includes a spacer 86, a housing 88, and a removable drawer 90. The spacer 86 is generally in the form of a plate with a plurality of apertures 92 sized and arranged to pass the injection needles 78. The periphery of the spacer 86 includes an upwardly turned portion 87 which provides for closure between the housing 12 and the housing 88.

The housing 88 is closed on all but two sides, having an open front side 94 and open bottom side 96. A pair of shelves 98 are defined along two opposed side walls 100, spaced slightly upwardly from the bottom side 96 in order to receive the drawer 90 in a position spaced over the cover plate 76 and the needles 78. The drawer 90 slides in and out of the open front side 94, moving along the sleeve 98.

The drawer 90 includes an open upper side 102 and an opposite, apertured lower side 104. The side 104 includes a plurality of openings 106 which provide for steam communication with the interior of the drawer 90. The front wall 108 of the drawer 90 is slightly enlarged to completely close the open front side 94 of the housing 88, as indicated in FIG. 2. A handle 110 extends forwardly from the front wall 108 is order to facilitate the insertion and removal of the drawer 90.

Figure 7:
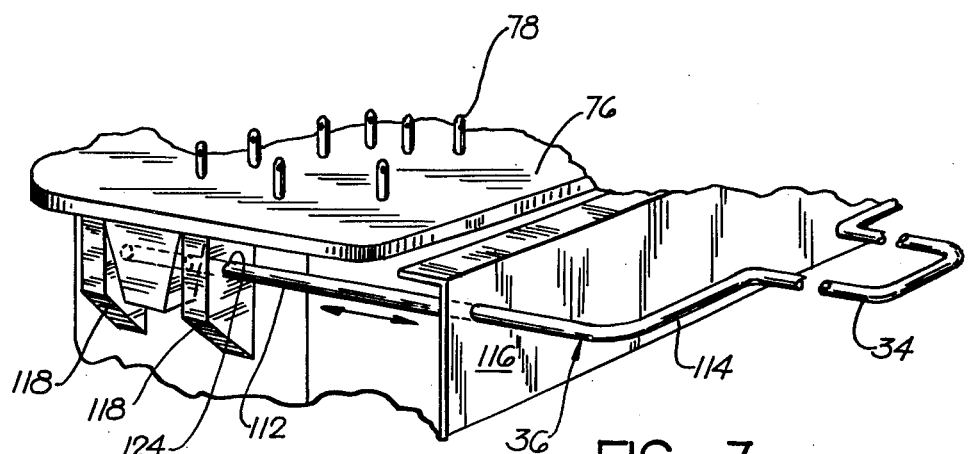
FIG. 7 is an enlarged, partial, perspective view of the securing mechanism for the injection steamer needle plate.

As indicated in FIGS. 5 and 7, the cover plate 76 is removably securable to the housing 12 through the operation of the U-shaped pin retainer 36. As best shown in FIG. 7, the U-shaped pin retainer 36 includes a pair of elongate portions 112 (only one of which is shown) joined by a cross portion 114, the portion 112 and 114 being totally enclosed within the housing 12 except for the exposed U-shaped portion 34 that extends forwardly away from the cross portion 114. Each elongate portion 112 slidingly threads through a bracket 116 in the housing 12 and a pair of tabs 118 on the side wall 62 of the steam chamber 44. The cross portion 114 is moveable between the bracket 116 and the base front face 26. The lower side 120 of the cover plate 76 includes a pair of tapered, downwardly protruding, opposed, apertured lands 122 each of which is designed to fit between a different pair of tabs 118 so that the aperture 124 in each land 122 lines up with the apertures 124 in a pair of adjacent tabs 118. This allows the elongate portions 112 to slide through the tabs 118 and lands 122 to sealingly secure the cover plate 76 on the chamber 44 at diametrically opposite positions.

The power source, connected through the electrical wire 40, is applied through the on/off switch 32 to a thermostat (not shown) which controls the current through the heating device 54 to maintain the surface 58 at a suitable temperature for quickly vaporizing water and producing steam. As described in U.S. Pat. No. 4,291,617 to Miller et al., hereby expressly incorporated by reference herein, a solenoid valve (not shown) may be provided along the water supply line 61. The solenoid valve is operable in response to actuation of the pushbuttom 28 to allow a metered amount of pressurized water to be sprayed into the steam chamber 44 through the water spray tube 60. Alternatively a special solenoid which provides a predetermined shot of water, as well known in the art, may be utilized when a supply of pressurized water is not available. In either case, the solenoid valve is energized to inject the water by depressing the pushbutton 28. If desired, however, a continuous steam flow can be implemented instead of the short or burst of steam.

The present invention may be operated in a variety of modes and utilized in a variety of ways. In one mode, useful in steaming integral solid items such as buns and rolls, the enclosure 14 is removed from the housing 12. The food items are impaled on the steam injection needles 78. Each time the pushbutton 28 is depressed, a shot of steam is supplied to the interior of the buns, rolls, or other food items impaled on the injection needles 78.

A variety of different cover plates 76, carrying differently configured needles 78, may be used in accordance with the particular mode in which the device is operated. Generally, when the steam injection needles 78 are used to supply steam to the interior of a food item, needles 78 with sharp ends 82 and of generally greater length are generally desirable.

To change cover plates 76, it is simply necessary to pull outwardly on the exposed portion 34 of the U-shaped pin retainer 36, as indicated in FIG. 5. This causes the pin retainer 36 to slide free of the lands 122 of the cover plate 76 and the tabs 118 of the chamber 44 so that the cover plate 76 may be lifted off of the housing 12. A different cover plate 76 may be reinstalled on the housing 12 by first positioning an O-ring 52 in the notch 50 of the chamber 44. Then the cover plate 76 is pressed downwardly against the bias of the O-ring 52 until the apertures 124 of the tabs 118 and the lands 122 align so that the elongate portions 112 of the retainer 36 may be inserted.

Whenever it is either not desirable or not possible to impale the food item on the steam injection needles 78, the enclosure 14 may be used to provide surface steaming of food items. This is particularly desirable in reheating spaghetti. In commerical food preparation, a large amount of spaghetti is usually pre-prepared so that as the spaghetti is ordered, portions may be warmed up for user consumption. The spaghetti may be advantageously warmed by steaming by first applying a small amount of oil to the spaghetti, and then steaming the spaghetti, resulting in a dish probably as tasty as if it had just been orginally cooked. In this way not only solid, intergral items such as buns, rolls and pastries may be warmed by impaling them on injection needles 78 but also flowable or bulk items which cannot conveniently be positioned directly on the injection needles 78 may be steamed all with a single steamer 10.

To use the steamer 10 in its bulk or flowable food item steaming mode, the spacer 86 is initially positioned over the steam injection needles 78. If desired shorter steam injection needles 78, having blunter ends 82 may be used in this mode. Since the spacer 86 has a plurality of openings 84 which receive the steam injection needles 78, the spacer 86 provides a mount for the enclosure 14 which may be telescopically secured against lateral movement atop the housing 12. The housing 88 may be inserted into the interior of the spacer 86 so that the upstanding side walls 87 of the spacer 86 secure the housing 88 against relative lateral movement. Then the drawer 90, loaded with the food item "A" to be steamed, may be slid into the housing 88 guided by the shelves 98. Since the top 106 of the drawer 90 is open and the bottom side 104 is apertured, the food within the drawer 90 is steamed generally on all surfaces.

The design of the present invention permits the use of conventional tap water for steaming, containing all of its impurities, without creating undue maintenance problems. In particular, the present invention provides for easy disassembly and access to the interior of steam chamber 44. The sliding U-shaped pin retainer 36 permits easy removal of the cover plate 76 for access and cleaning of the steam chamber 44. Once inside the steam chamber 44, the spray tube 60 may be easily removed from the water line 61 for cleaning. Since the enclosure 14 is also totally disassemblable, the entire apparatus 10 may be easily and efficiently cleaned.

While the present invention has been described with respect to a single preferred embodiment, those skilled in the art will appreciate that a number of modifications and variations therefrom will be possible and it is intended to cover within the appended claims all such modifications and variations as come within the true spirit and scope of the present invention.

What is claimed and desired to be secured by Letters Patent of the United States is:

1. A steamer for warming food items, said steamer convertible from a needle injection steaming mode to a flash steaming mode, said steamer comprising:
   a housing;
   a chamber defined within said housing, said chamber including means for generating steam;
   a plurality of hollow, upstanding injection needles, mounted on said housing, and adapted in said needle injection steaming mode to pierce a food item, each of said needles including a pair of spaced apart open ends, and each of said needles in fluid communication by way of one of said open ends with said chamber;
   a removable riser plate mountable on said housing, said riser plate including a plurality of apertures therein arranged to permit the riser plate to rest on the top of said housing, said riser plate further including an upstanding peripheral flange extending upwardly from the top of the housing past the tops of said needles;
   an enclosure removably mountable on said riser plate, covering said needles and in fluid communication with the other open end of each of said needles, said enclosure including a pair of inwardly projecting guide rails for engaging the peripheral flange of the riser plate and supporting the enclosure thereon; and
   an open top drawer slidable into and out of said enclosure on said guide rails at a position above said needles, said drawer being adapted to contain said food items to be flash steamed within the interior of said drawer, said drawer interior being in fluid communication with said chamber by way of said needles when said drawer is located within said enclosure.

2. The steamer of claim 1 wherein said drawer includes an open top and an apertured bottom.

3. The steamer of claim 1 wherein said enclosure includes means for receiving said drawer in a position spaced above said needles.

4. The steamer of claim 1 wherein said enclosure is telescopically received on said needles and is freely removable therefrom.

5. The steamer of claim 1 wherein said chamber is closed by a removable cover plate, said cover late removably held atop said chamber by a sliding pin, said injection needles mounted to extend through and upwardly away from said cover plate.

6. The steamer of claim 5 wherein said pin is generally U-shaped and includes a handle portion which is manually graspable from the exterior of said housing, said pin further including a pair of generally elongate portions, said chamber and said cover plate each including a pair of opposed portions arranged to telescopically receive said elongate portions so as to removably secure said cover plate on said chamber.

7. The steamer of claim 1 wherein said enclosure includes a member having a plurality of apertures in order to telescopically receive said injection needles, said enclosure further including a covering arranged to mate with and be removably secured on said housoing by said member, said covering including means for reciprocatingly receiving said drawer in a position spaced above said needles, said drawer including an apertured bottom surface.

8. A steamer for warming food items comprising:
   a housing;
   a chamber defined within said shousing, said chamber including means for generating steam;
   a plate removably mounted on said housing for covering said chamber;

a plurality of steam injection needles extending through said plate and in fluid communication with said chamber; and means for sealingly securing said plate to said chamber, said securing means including a chamber portion and a plate portion and an elongate pin which slidably extends through said chamber portion and said plate portion, said pin including an exposed portion extending outwardly of said housing to permit manual release of said plate from said chamber.

9. The steamer of claim 8 wherein said pin is generally U-shaped, and includes a cross portion and a pair of generally parallel elongate portions connected by said cross portion, each of said elongate portions extending through a portion of said chamber and an adjacent portion of said plate so as to secure said plate to said chamber at two generally opposed points.

10. The steamer of claim 9 wherein said cross portion includes an extension which extends outwrdly of said housing to enable manual grasping and reciprocation of said pin.

11. The steamer of claim 10 including a resilient seal interposable between said plate and said chamber so as to provide a seal when said plate is compressed against said chamber.

12. The steamer of claim 11 wherein said plate includes a pair of downwardly extending apertured tabs and said chamber includes two pairs of spaced, apertured lands, each pair of lands arranged to receive one of said tabs between said pair of lands, such that when said cover plate is properly sealed on said chamber, the apertures in said tabs are aligned with the apertures in said lands to that said pin may be inserted through said apertures.

* * * * *